(12) United States Patent
Hruby et al.

(10) Patent No.: US 8,197,578 B2
(45) Date of Patent: Jun. 12, 2012

(54) LIQUID DEGASSER FOR A SPACE DEVICE

(75) Inventors: Vladimir J. Hruby, Newton, MA (US);
Nate Demmons, Mason, NH (US); Tom Roy, Newton, MA (US); Doug Spence, Brookline, MA (US); Eric Ehrbar, Brookline, MA (US); Jurg Zwahlen, New Ipswich, NH (US); Charles Gasdaska, Shrewsbury, MA (US)

(73) Assignee: Busek Company, Inc., Natick, MA (US)

( * ) Notice: Subject to any disclaimer, the term of this patent is extended or adjusted under 35 U.S.C. 154(b) by 314 days.

(21) Appl. No.: 11/881,020

(22) Filed: Jul. 25, 2007

(65) Prior Publication Data

US 2008/0083335 A1     Apr. 10, 2008

Related U.S. Application Data

(60) Provisional application No. 60/833,345, filed on Jul. 26, 2006.

(51) Int. Cl.
*B01D 53/22* (2006.01)
*B01D 19/00* (2006.01)

(52) U.S. Cl. ............... 96/6; 96/8; 96/10; 96/11; 96/193; 95/46; 95/47; 95/51; 95/52; 95/54; 210/640; 210/500.27

(58) Field of Classification Search ............. 96/6, 8, 96/10, 11, 193; 95/45, 46, 47, 51, 52, 54; 210/640, 641, 500.21, 500.27
See application file for complete search history.

(56) References Cited

U.S. PATENT DOCUMENTS

| | | | | |
|---|---|---|---|---|
| 3,631,654 A | * | 1/1972 | Riely et al. | 96/6 |
| 3,678,654 A | * | 7/1972 | Low et al. | 95/46 |
| 3,803,810 A | * | 4/1974 | Rosenberg | 96/6 |
| 4,046,529 A | * | 9/1977 | Fletcher et al. | 96/127 |
| 4,399,264 A | | 8/1983 | Squire | |
| 4,485,250 A | | 11/1984 | Squire | |
| 4,530,569 A | | 7/1985 | Squire | |
| 4,723,734 A | * | 2/1988 | Naumann | 244/158.1 |
| 4,754,009 A | | 6/1988 | Squire | |
| 4,935,477 A | | 6/1990 | Squire | |
| 4,948,851 A | | 8/1990 | Squire | |
| 4,973,142 A | | 11/1990 | Squire | |
| 4,975,505 A | | 12/1990 | Squire | |
| 4,977,008 A | | 12/1990 | Squire | |
| 4,977,025 A | | 12/1990 | Squire | |

(Continued)

OTHER PUBLICATIONS

Pinnau, Ingo, and Troy, Lora G., "*Gas and vapor transport properties of amorphous perfluorinated copolymer membranes based on 2,2-bistrifluoromethyl-4,5-difluoro-1,3-dioxole/tetrafluoroethylene*", Journal of Membrane Science 109 (1996) 125-133.

*Primary Examiner* — Jason M Greene
(74) *Attorney, Agent, or Firm* — Iandiorio Teska & Coleman, LLP

(57) ABSTRACT

A liquid degasser for a space device including a gas permeable material configured for contact with a flow of liquid to be de-gassed on one side and a vacuum on the other side, and wherein the gas permeable material allows gas in the liquid to diffuse to the vacuum to remove the gas from the liquid.

34 Claims, 6 Drawing Sheets

U.S. PATENT DOCUMENTS

| | | | |
|---|---|---|---|
| 4,977,026 A | 12/1990 | Squire | |
| 4,977,297 A | 12/1990 | Squire | |
| 4,981,625 A * | 1/1991 | Rhim et al. | 264/13 |
| 4,982,056 A | 1/1991 | Squire | |
| 4,985,055 A * | 1/1991 | Thorne et al. | 96/6 |
| 4,985,308 A | 1/1991 | Squire | |
| 4,986,837 A * | 1/1991 | Shibata | 96/6 |
| 4,999,248 A | 3/1991 | Squire | |
| 5,000,547 A | 3/1991 | Squire | |
| 5,006,382 A | 4/1991 | Squire | |
| 5,051,114 A | 9/1991 | Nemser et al. | |
| 5,076,659 A | 12/1991 | Bekiarian et al. | |
| 5,244,478 A * | 9/1993 | Jolly | 95/46 |
| 5,276,121 A | 1/1994 | Resnick | |
| 5,296,283 A | 3/1994 | Froggatt | |
| 5,308,685 A | 5/1994 | Froggatt | |
| 5,310,838 A | 5/1994 | Hung et al. | |
| 5,324,889 A | 6/1994 | Resnick | |
| 5,326,839 A | 7/1994 | Resnick | |
| 5,338,608 A | 8/1994 | Resnick | |
| 5,353,368 A | 10/1994 | Resnick | |
| 5,354,910 A | 10/1994 | Hung et al. | |
| 5,408,020 A | 4/1995 | Hung et al. | |
| 5,536,378 A * | 7/1996 | Gibson et al. | 204/234 |
| 5,695,545 A * | 12/1997 | Cho et al. | 95/46 |
| 6,105,416 A * | 8/2000 | Nelson et al. | 73/23.2 |
| 6,315,815 B1 * | 11/2001 | Spadaccini et al. | 95/46 |
| 6,402,818 B1 | 6/2002 | Sengupta | |
| 6,403,956 B1 * | 6/2002 | Sinha | 250/298 |
| 6,755,899 B2 * | 6/2004 | Nagai | 96/6 |
| 6,837,992 B2 * | 1/2005 | Gerner et al. | 96/6 |
| 6,942,718 B1 * | 9/2005 | Schmidt | 95/46 |
| 7,100,461 B2 * | 9/2006 | Bradley et al. | 73/864.33 |
| 7,141,092 B1 * | 11/2006 | Roychoudhury et al. | 95/90 |
| 7,601,203 B2 * | 10/2009 | Reeve et al. | 96/6 |
| 2009/0101557 A1 * | 4/2009 | Tsai | 210/181 |
| 2010/0320377 A1 * | 12/2010 | Cotter et al. | 250/283 |

* cited by examiner

LIQUID DEGASSER FOR A SPACE DEVICE

RELATED APPLICATIONS

This application claims benefit of and priority to U.S. Provisional Patent Application No. 60/833,345, filed Jul. 26, 2006, incorporated by reference herein.

GOVERNMENT RIGHTS

This invention was developed with U.S. Air Force support under Contract Nos. NAS7-1407/Subcontract No. 1247199; FA8650-04-C-2504; and HQ0006-05-C-7235.

FIELD OF THE INVENTION

This invention relates to a liquid degasser for a space device and more generally to a liquid degasser.

BACKGROUND OF THE INVENTION

Space propulsion devices, e.g, colloids thrusters, hydrazine fueled arcjets, electrospray thrusters, monopropellant thrusters, bi-propellant thrusters, and the like, often utilize liquid propellant that is delivered to the thruster. If gas is present in the liquid propellant e.g., gas bubbles, the gas can interrupt the flow of fuel, resulting in a stall or loss of control of the space device. Other space devices, such as space based power systems, e.g., fuel cells, cooling loops, and the like, similarly require the liquid therein to be free of gas. Additionally, an environmental gas scrubber, e.g., a $CO_2$ scrubber for an outer space life support system that uses liquid to absorb ambient gas requires the removal of trapped gas from the re-condensed liquid.

BRIEF SUMMARY OF THE INVENTION

It is therefore an object of this invention to provide a liquid degasser for a space device.

It is a further object of this invention to provide such a liquid degasser for a space device which efficiently removes gas from a liquid.

It is a further object of this invention to provide such a liquid degasser which prevents stalls and loss of control of a space propulsion device.

It is a further object of this invention to provide such a liquid degasser which removes gas from a liquid of an environmental life support system.

It is a further object of this invention to provide a liquid degasser for removing gas from a liquid.

The subject invention results from the realization that a liquid degasser for a space device which efficiently removes gas from a liquid is effected, in one embodiment, with a gas permeable material which contacts a flow of liquid to be de-gassed on one side and a vacuum on the other side such that the gas permeable material allows a gas in the liquid to diffuse from the liquid to the vacuum, resulting in removal of the gas from the liquid.

The subject invention, however, in other embodiments, need not achieve all these objectives and the claims hereof should not be limited to structures or methods capable of achieving these objectives.

This invention features a liquid degasser for a space device including a gas permeable material configured for contact with a flow of liquid to be degassed on one side and a vacuum on the other side, and wherein the gas permeable material allows gas in the liquid propellant to diffuse to the vacuum to remove the gas from the liquid.

In one embodiment, the gas permeable material may be configured as a tube. The flow of liquid propellant may be located inside the tube and the vacuum may be located outside the tube. The flow of liquid propellant may be located outside the tube and the vacuum may be located inside the tube. The gas permeable material may be configured as a membrane. The flow of liquid propellant may be located on one side of the membrane and the vacuum may be located on the other side of the membrane. The tube may be located upstream of the space propulsion device. The tube may be disposed inside a manifold of the space propulsion device. The membrane may be disposed inside a manifold of the space propulsion device. A porous powder medium and may be disposed in the manifold proximate the vacuum. The space propulsion device may be chosen from the group consisting of a colloid thruster, an arcjet, electrospray thruster, a monopropellant thruster, and a bi-propellant thruster, a cooling loop of a space based power system, a fuel cell of a space based power system, and an environmental gas scrubber. The gas permeable material may include an amorphous fluoropolymer. The amorphous fluoropolymer may include TEFLON® AF. The gas permeable material may include a polymer comprising silicon and/or fluorine. The polymer may include a polymer chosen from the group consisting of polydimethylsiloxane (PDMS), poly (1-trimethylsilyl-1-propyne) (PTMSP) and poly (tetrafluoroethylene) derivatives. The liquid may be a propellant.

This invention also features a liquid degasser for a space device including a gas permeable material configured as a tube for contact with a liquid to be de-gassed on one side and a vacuum on the other side, and wherein the gas permeable material allows gas in the liquid to diffuse from the liquid to the vacuum to remove the gas from the liquid.

This invention further features a liquid degasser for a space propulsion device including a gas permeable material configured as a membrane for contact with a liquid to be de-gassed on one side and a vacuum on the other side, and wherein the gas permeable material allows gas in the liquid to diffuse from the liquid to the vacuum to remove the gas from the liquid.

This invention also features a liquid degasser including a gas permeable material configured as a membrane for contact with a liquid to be de-gassed on one side and a vacuum on the other side, and wherein the gas permeable material allows gas in the liquid to diffuse from the liquid to the vacuum to remove the gas from the liquid propellant.

In one embodiment, the gas permeable material may be configured as a tube. The liquid may include a propellant. The flow of liquid propellant may be located inside the tube and the vacuum may be located outside the tube. The flow of liquid propellant may be located outside the tube and the vacuum may be located inside the tube. The gas permeable material may be configured as a membrane. The flow of liquid propellant may be located on one side of the membrane and the vacuum may be located on the other side of the membrane. The tube may be located upstream of a space device. The tube may be disposed inside a manifold of a space device. The membrane may be inside a manifold of the space device. A porous powder medium and may be disposed in the manifold proximate the vacuum. The liquid de-gasser may be configured for use with a space device chosen from the group consisting of a colloid thruster, an arcjet, and electrospray thruster, a monopropellant thruster, a bi-propellant thruster, a cooling loop of a space based power system, and a fuel cell of a space based power system and an environmental gas scrubber. The gas permeable material may include an amorphous fluoropolymer. The amorphous fluoropolymer may include TEFLON® AF. The gas permeable material may include a polymer comprising silicon and/or fluorine. The polymer may include a polymer chosen from the group consisting of polydimethylsiloxane (PDMS), poly (1-trimethylsilyl-1-propyne) (PTMSP) and poly (tetrafluoroethylene) derivatives. The liquid may include a propellant.

This invention also features a liquid degasser including a gas permeable material configured as a tube for contact with a liquid to be de-gassed on one side and a vacuum on the other side, and wherein the gas permeable material allows gas in the liquid to diffuse to the vacuum to remove the gas from the liquid.

This invention further features a liquid degasser including a gas permeable material configured as a membrane for contact with a liquid to be de-gassed on one side and a vacuum on the other side, and wherein the gas permeable material allows gas in the to diffuse to the vacuum to remove the gas from the liquid.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
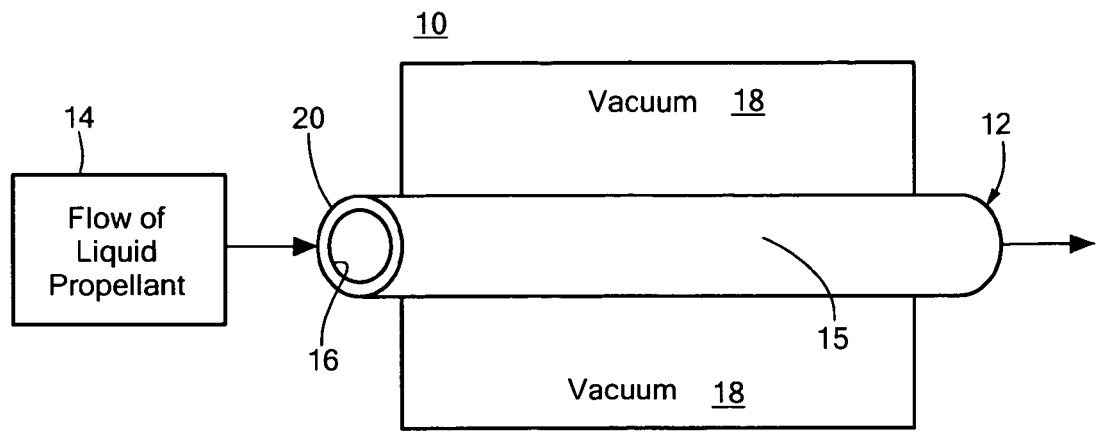
FIG. 1 is a schematic three-dimensional view of one embodiment of the liquid degasser of this invention configured as a tube wherein the gas diffuses from within the tube to the vacuum.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

There is shown in FIG. 1, one embodiment of liquid degasser 10 of this invention. Liquid degasser 10 includes gas permeable material 12, e.g., an amorphous fluoropolymer, such as TEFLON® AF, or a polymer comprising silicon and/or fluorine which is configured for contact with flow of liquid 14, e.g., a liquid propellant or any liquid which absorbs gas to be degassed, on side 16 and vacuum 18 on side 20. TEFLON® AF is available from Biogeneral, Inc., San Diego, Calif. TEFLON® AF may include TEFLON® AF 1600 and/or TEFLON® AF 2400, which may include one or more of the following: an amorphous copolymer of tetrafluoroethylene and perfluoro-2,2-dimethyl-1,3-dioxole, copolymers of tetrafluoroethylene and bis-2,2-trifluoromethyl-4,5-difluoro-1,2-dioxole, or a copolymer of 2-2-bistrifluoromethyl-4,5-difluoro-1,3-dioxole and other fluorine-containing monomers. Additional details of exemplary TEFLON® AF which made be used for gas permeable material 12 are disclosed in, e.g., U.S. Pat. Nos. 4,977,008, 5,006,382, 5,356,668, and 5,479,430, and 6,055,723, incorporated by reference herein. The polymer comprising silicon and/or fluorine may include polydimethylsiloxane (PDMS), poly (1-trimethylsilyl-1-propyne) (PTMSP) and poly (tetrafluoroethylene) derivatives.

Further details of one example of gas permeable material 12 which includes a polymer comprising silicon and/or fluorine is disclosed in "*Gas and vapor transport properties of amorphous perfluorinated copolymer membranes based on 2,2-bistrifluoromethyl-4,5-difluoro-1,3-dioxole/tetrafluoroethylene*", Pinnau et al., Journal of Membrane Science, 109, 125-133, (1996), incorporated by reference herein. In this example, gas permeable membrane 12 is configured as tube 15. Gas permeable material 12 is highly permeable to gas in a flow of liquid 14, but is not permeable to liquid 14. Flow of liquid 14 is typically pressurized. Vacuum 18 may be provided by a pump or similar means as known by those skilled in the art or may be located in outer space. The result is gas in liquid 14 diffuses from liquid 14 on side 16 of material 12 to vacuum 18 on side 20 to effectively and efficiently remove gas from liquid 14. Exemplary gas which may be removed from liquid 14 include, inter alia, water vapor, $CO_2$, CO, $N_2$, $O_2$, hydrocarbon vapors, and the like.

Figure 2:
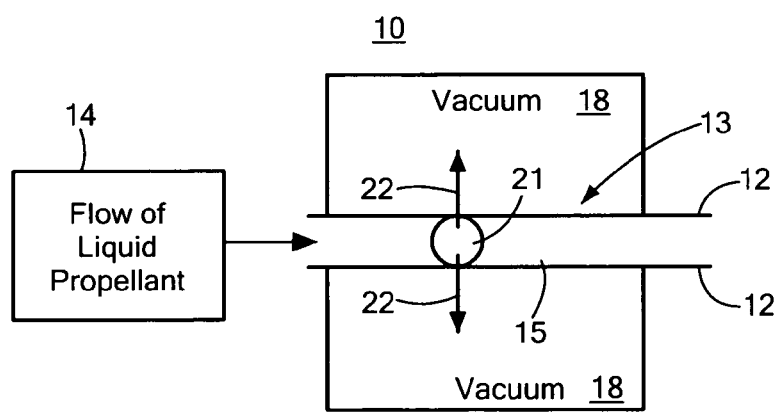
FIG. 2 is a schematic side view showing in further detail the diffusion of gas from the tube to the vacuum shown in FIG. 1.

FIG. 2, where like parts have been given like numbers, shows an example of gas in liquid 14 which has formed gas bubble 21 inside tube 15 of gas permeable material 12. The gas of gas bubble 21 diffuses through gas permeable material 12 into vacuum 18, as shown by arrows 22, and is removed from liquid 14. The result is any gas in liquid 14 is efficiently removed using liquid 14 degasser 10 of this invention.

Figure 3:
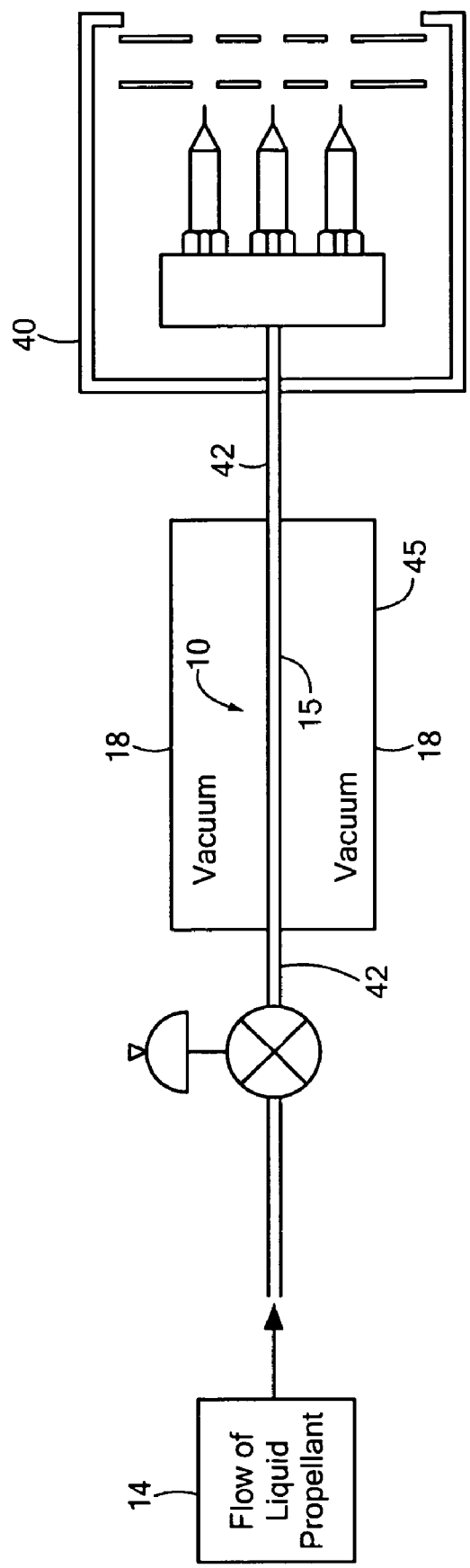
FIG. 3 is a schematic side view of one embodiment of the liquid degasser shown in FIG. 1 employed with a space device in accordance with this invention.
Figure 4:
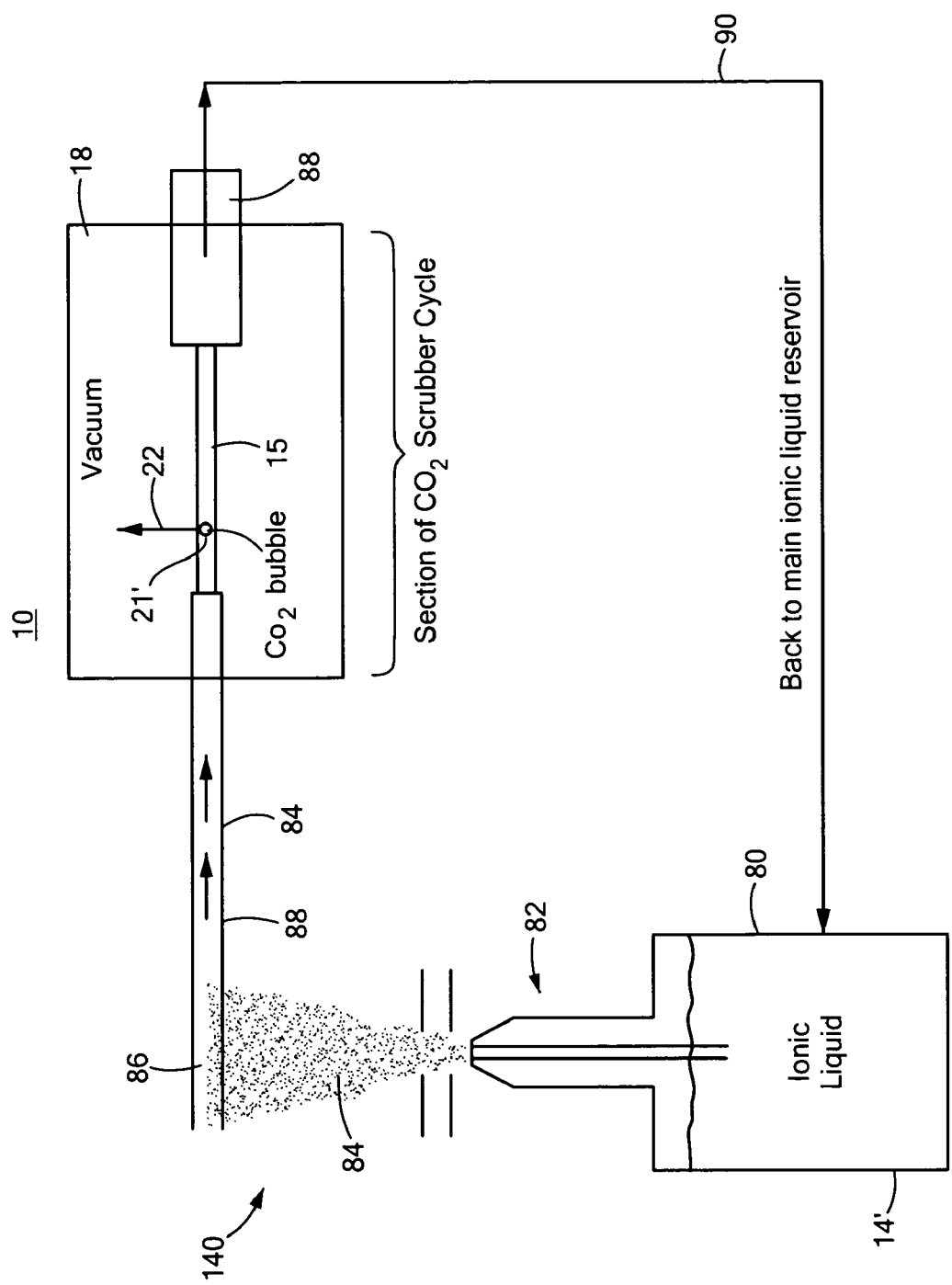
FIG. 4 is a schematic side view of another embodiment of the liquid degasser shown in FIG. 1 employed with a space device in accordance with this invention.

In one embodiment, liquid 14 degasser 10 may be employed with space device 40, FIG. 3, e.g., a colloids thruster, an arcjet, an electrospray thruster, a monopropellant thruster, a bi-propellant thruster, space-based power systems, e.g., cooling loops and fuel cells (not shown), and the like. In this design, tube 15 is made of gas permeable material 12, FIGS. 1-2, and is located in vacuum 18. Space device 40 typically operates in outer space which provides the vacuum environment for vacuum 18. Thus, tube 15 is continuously exposed to vacuum 18. Enclosure 45 protects tube 15. Tube 15 of gas permeable material 12 operates similar as discussed above with reference to FIGS. 1-2 to effectively remove any gas in flow of liquid 14 in line 42 before liquid 14, e.g., liquid propellant, reaches thruster 40. The result is thruster 40 receives liquid 14 which is free of any gas. Therefore, the problems associated with gas in flow liquid 14 in line 42, e.g., a stall or loss of control of thruster 44, are eliminated.

In another embodiment, liquid degasser 10 may be employed with a space device such as an environmental gas scrubber 140, e.g., a $CO_2$ gas scrubber for an outer space life support system or other similar type environmental scrubbers. In this example, environmental gas scrubber 140 includes reservoir 80 of liquid 14', e.g., an ionic liquid, such as an EMI-Im propellant ($C_8H_{11}F_6N_3O_4S_2$). Colloids thruster 82 coupled to reservoir 80 generates electrospray 84 which is a fine mist of ionic liquid 14'. Electrospray 84 captures ambient gas, e.g., $CO_2$ indicated at 83, in ambient atmosphere 83. Electrospray collector 86 re-condenses electrospray 84 to an ionic liquid in line 88 which is now infested with $CO_2$ gas. The $CO_2$ infested ionic liquid in line 84 proceeds to liquid degasser 10 with tube 15 made of gas permeable membrane 12, similar as discussed above with reference to FIG. 3 to remove the $CO_2$ from the ionic liquid, e.g., as shown by $CO_2$ bubble 21' diffusing from the liquid in tube 15 to vacuum 18. In this design, vacuum 18 is created in housing 19, although vacuum 18 may be in outer space as discussed above. Pump 88 then pumps the ionic liquid free of $CO_2$ gas to reservoir 80, as shown by line 90. Thus, environmental gas scrubber 140 has removed (scrubbed) the $CO_2$ gas in ambient atmosphere 85. Although in this example environmental gas scrubber 140 removes $CO_2$ gas in ambient atmosphere 83 using a tube 15 of gas permeable material, this is not a necessary limitation of this invention, as scrubber 140 may use a membrane of gas permeable material 12 (discussed below) and either design may also remove other gases from ambient atmosphere 85, as known by those skilled in the art.

Figure 5:
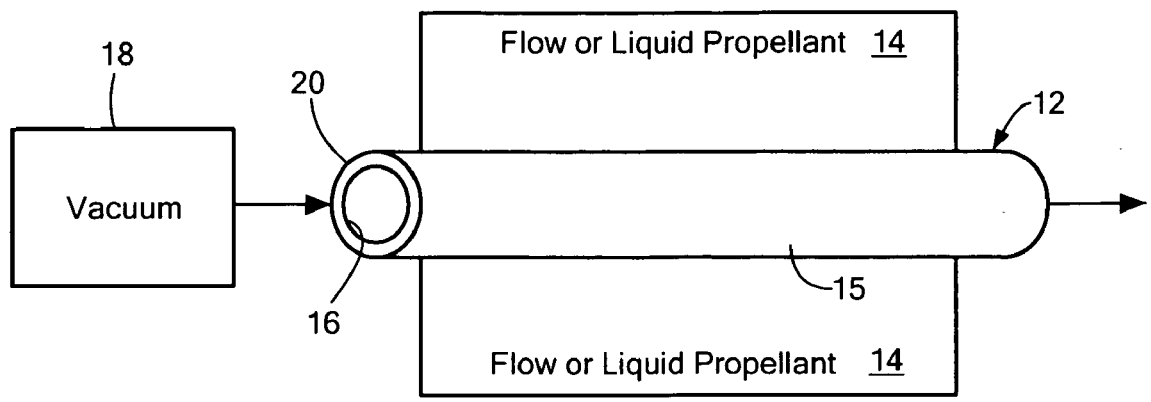
FIG. 5 is a schematic three-dimensional view of another embodiment of the liquid degasser of this invention configured as a tube wherein the gas diffuses from outside the tube to a vacuum inside the tube.
Figure 6:
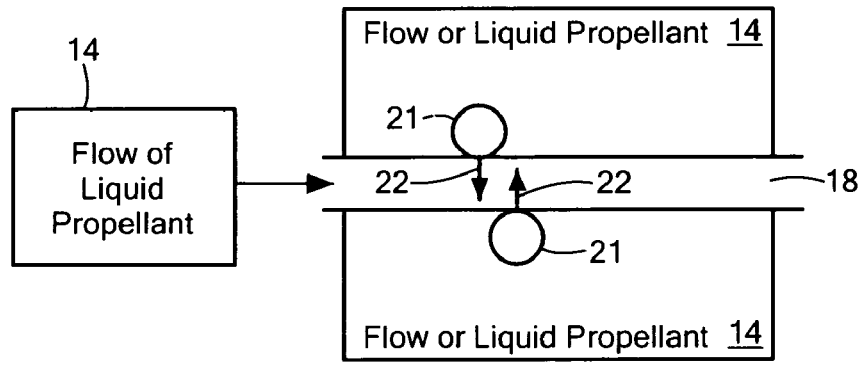
FIG. 6 is a schematic side view showing in further detail the diffusion of gas from outside the tube into the tube shown in FIG. 4.

In another design, liquid degasser 10a, FIG. 5, of this invention, where like parts have been given like numbers, includes tube 15 made of gas permeable material 12 of similar design as discussed above with reference to FIGS. 1-2. However, in this design, gas permeable membrane 12 is configured to contact flow of liquid on side 20 and vacuum 18 on side 16. Utilizing this design, any gas in flow of liquid 14, e.g., gas bubbles 21, FIG. 6, diffuses from flow of liquid 14 in tube 15 on side 20, FIG. 5, to vacuum 18 on side 16, as shown by arrows 22, FIG. 6, to efficiently remove gas from liquid 14.

Figure 7A:
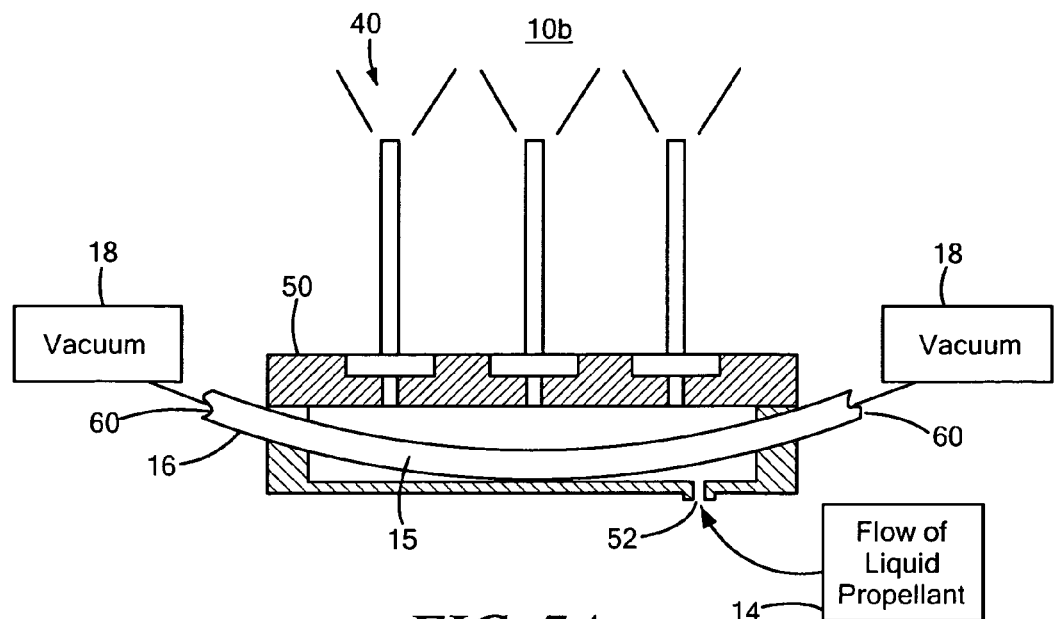
FIGS. 7A and 7B are schematic side views of one embodiment of the liquid degasser shown in FIG. 4 employed with a space device in accordance with this invention.
Figure 7B:
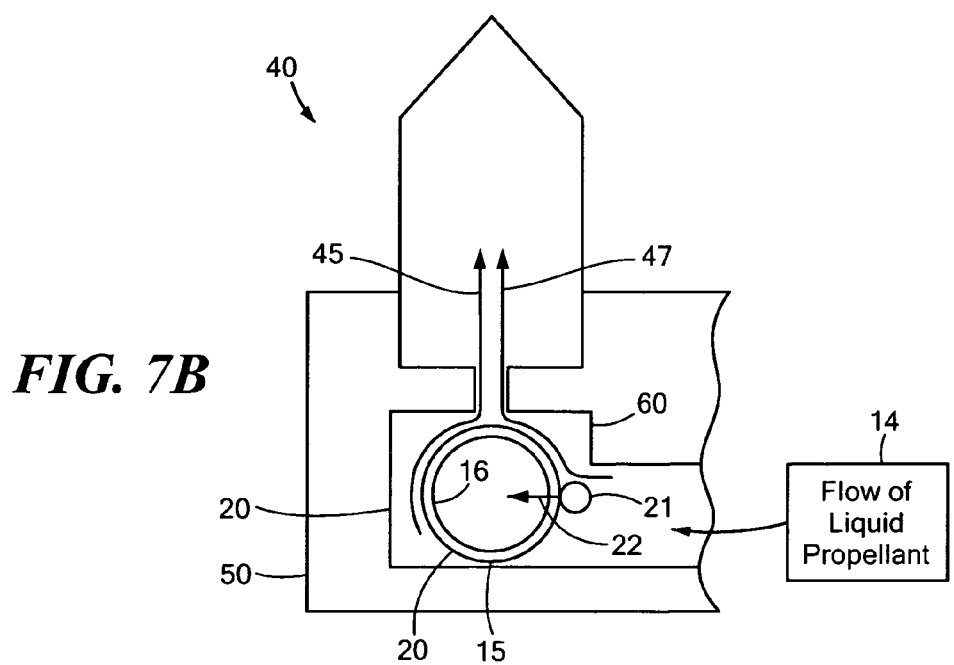

In one design of this invention, liquid degasser 10a may be employed within space vehicle 40, FIG. 7A, e.g., a colloid thruster, an arcjet, an electrospray thruster, a monopropellant thruster, a bi-propellant thruster or space-based power systems, e.g., cooling loops and fuel cells (not shown), and the like. In this example, gas permeable membrane 12 is configured as tube 15 disposed in manifold 50 of a space device 40. Flow of liquid 14, e.g., liquid propellant, enters manifold 50 via inlet port 52 and travels proximate to tube 15 made of permeable material 12, FIG. 5. Outlets 60, FIG. 7A, of tube 15 are exposed to vacuum 18. Similar as discussed above with reference to FIGS. 5-6, any gas in liquid 14 in manifold 50 proximate to tube 15 will diffuse from liquid 14 to vacuum 18 in tube 15 to remove gas from liquid 14. FIG. 7B shows a side view of manifold 50 of space device 40 and the path of flow of liquid 14 about tube 15, shown by arrows 45 and 47. An exemplary gas bubble 21 in liquid 14 is shown diffusing from side 20 of tube 15 to side 16 having vacuum 18, as shown by arrow 22.

Figure 8:
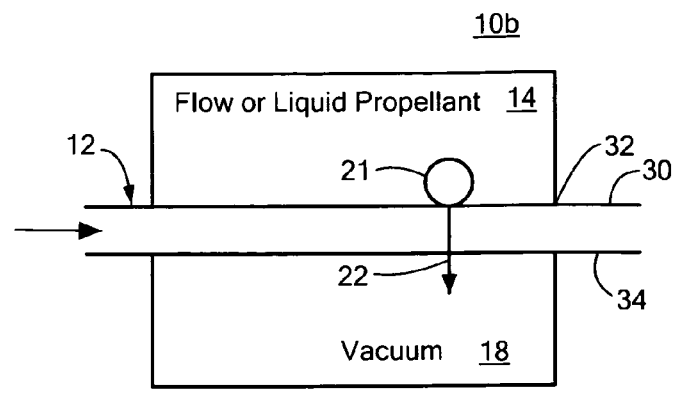
FIG. 8 is a schematic side view of yet another embodiment of the liquid degasser of this invention configured as a membrane.

In another embodiment of this invention, liquid degasser, 10b, FIG. 8, where like parts have been given like numbers, includes the gas permeable material 12 configured as membrane 30. Gas permeable membrane has a similar design to gas permeable membrane 12 discussed above. Flow of liquid is located one side of membrane 30, e.g., side 32, and vacuum 18 located on the other side of membrane 32, e.g., side 34. Utilizing this design, any gas in flow of liquid 14 on side 30 of membrane 30, e.g., bubble 21, diffuses to vacuum 18 on side 34, as shown by arrow 22 to remove the gas from liquid 14.

Figure 9:
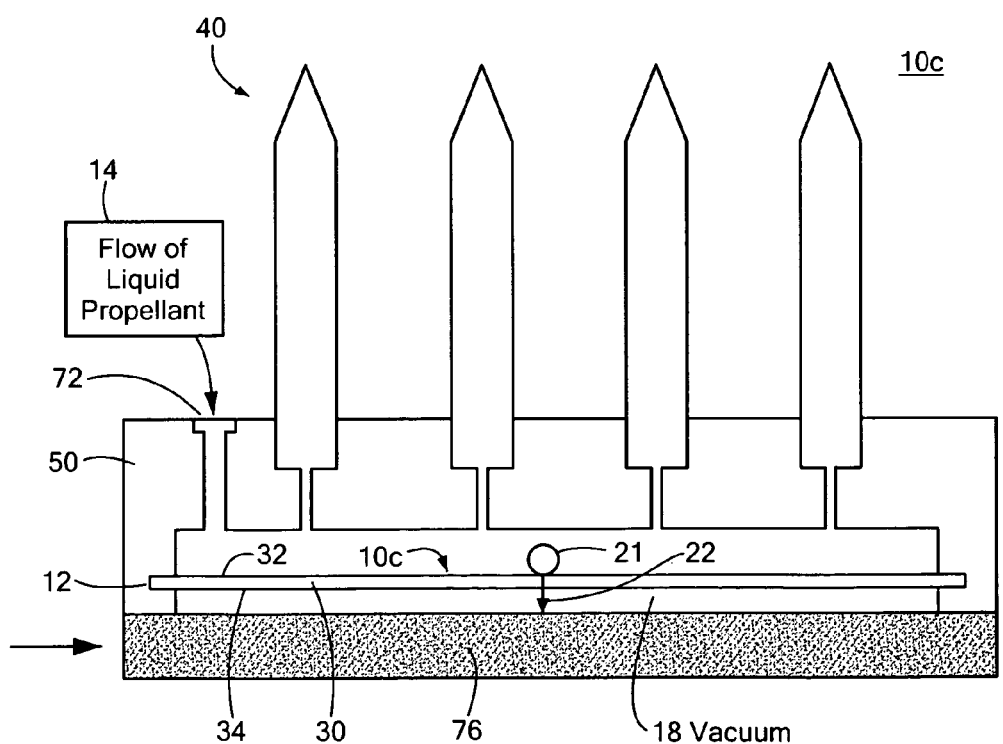
FIG. 9 is a schematic side view of one embodiment of the liquid degasser shown in FIG. 7 employed with a space device in accordance with this invention.

In another embodiment, liquid degasser 10b may be employed with space device 40, FIG. 9, where like parts have been given like numbers, e.g., a colloid thruster, an arcjet, an electrospray thruster, a monopropellant thruster, a bi-propellant thruster, or space-based power systems, e.g., cooling loops and fuel cells (not shown), and the like. Membrane 30 is made of gas permeable material 12 and disposed in manifold 50 of a thruster 40. In this example, vacuum 18 is located on side 34 of membrane 30 and porous powder metal medium 76 is preferably proximate to vacuum 18. Flow of liquid 14 on side 32 of membrane 30 enters manifold 50 via inlet port 72. Any gas in flow of liquid 14 diffuses from liquid flow of 14 in manifold 50 through membrane 30 and into vacuum 18 to effectively remove any gas in flow of liquid 14, e.g., as shown by gas bubble 21 in liquid 14 diffusing into vacuum 18, as shown by arrow 22.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A system for removing high volatility components for a space device comprising:
   a highly permeable material configured for contact with a flow of liquid mixture having high volatility components and low volatility components on one side and an outer space vacuum provided by an outer space environment on the other side; and
   the highly permeable material further configured to allow vaporized high volatility components to permeate therethrough and into the outer space vacuum to remove the high volatility components from the liquid mixture.

2. The system of claim 1 in which the gas permeable membrane is configured as a tube.

3. The system of claim 2 in which the flow of liquid is located inside the tube and the vacuum is located outside the tube.

4. The system of claim 2 in which the liquid is located outside the tube and the vacuum is located inside the tube.

5. The system of claim 1 in which the gas permeable material is configured as a membrane.

6. The system of claim 5 in which the liquid is located on one side of the membrane and the vacuum is located on the other side of the membrane.

7. The system of claim 3 in which the tube is located upstream of the space device.

8. The system of claim 4 in which the tube is disposed inside a manifold of the space device.

9. The system of claim 6 in which the membrane is disposed in a manifold of the space device.

10. The system of claim 9 in which a porous powder metal material is disposed in the manifold proximate the vacuum.

11. The system of claim 1 in which the space device includes a space device chosen from the group consisting of: a colloid thruster, an arcjet, and electrospray thruster, a monopropellant thruster, a bi-propellant thruster, a cooling loop of a space based power system, a fuel cell of a space based power system, and an environmental gas scrubber.

12. The system of claim 1 in which the gas permeable material includes an amorphous fluoropolymer.

13. The system of claim 1 in which the gas permeable material includes a polymer comprising silicon and/or fluorine.

14. The system of claim 1 in which the polymer includes a polymer chosen from the group consisting of polydimethylsiloxane (PDMS), poly (1-trimethylsilyl-1-propyne) (PT-MSP) and poly (tetrafluoroethylene) derivatives.

15. The system of claim 1 in which the liquid includes a propellant.

16. A system for a space device comprising:
   a highly permeable material configured as a tube for contact with a liquid mixture having high volatility components and low volatility components on one side and an outer space vacuum an outer space vacuum provided by an outer space environment on the other side; and
   the highly permeable material further configured to allow vaporized high volatility components to permeate therethrough and into the outer space vacuum to remove the high volatility components from the liquid mixture.

17. A system for removing high volatility components for a space device comprising:
   a highly permeable material configured as a membrane for contact with a liquid mixture having high volatility components and low volatility components on one side and an outer space vacuum an outer space vacuum provided by an outer space environment on the other side; and
   the highly permeable material further configured to allow vaporized high volatility components to permeate therethrough and into the outer space vacuum to remove the high volatility components from the liquid mixture.

18. A system for removing high volatility components comprising:
   a highly permeable material configured as a membrane for contact with a liquid mixture having high volatility components and low volatility components on one side and an outer space vacuum an outer space vacuum provided by an outer space environment on the other side; and
   the highly permeable material further configured to allow vaporized high volatility components to permeate therethrough and into the outer space vacuum to remove the high volatility components from the liquid mixture.

19. The system of claim 18 in which the gas permeable membrane is configured as a tube.

20. The system of claim 19 in which the flow of liquid is located inside the tube and the vacuum is located outside the tube.

21. The system of claim 19 in which the liquid is located outside the tube and the vacuum is located inside the tube.

22. The system of claim 18 in which the gas permeable material is configured as a membrane.

23. The system of claim 22 in which the liquid is located on one side of the membrane and the vacuum is located on the other side of the membrane.

24. The system of claim 20 in which the tube is located upstream of a space device.

25. The system of claim 21 in which the tube is disposed inside a manifold of a space device.

26. The system of claim 23 in which the membrane is disposed in a manifold of a space device.

27. The system of claim 26 in which a porous powder metal material is disposed in the manifold proximate the vacuum.

28. The system of claim 18 further configured for use with a space device chosen from the group consisting of: a colloid thruster, an arcjet, and electrospray thruster, a monopropellant thruster, a bi-propellant thruster, a cooling loop of a space based power system, a fuel cell of a space based power system, and an environmental gas scrubber.

29. The system of claim 18 in which the gas permeable material includes an amorphous fluoropolymer.

30. The system of claim 18 in which the gas permeable material includes a polymer comprising silicon and/or fluorine.

31. The system of claim 30 in which the polymer includes a polymer chosen from the group consisting of polydimethylsiloxane (PDMS), poly (1-trimethylsilyl-1-propyne) (PT-MSP) and poly (tetrafluoroethylene) derivatives.

32. The system of claim 18 in which the liquid includes a propellant.

33. A system for removing high volatility components comprising:
   a highly permeable material configured as a tube for contact with a liquid mixture having high volatility components and low volatility components on one side and an outer space vacuum an outer space vacuum provided by an outer space environment on the other side; and
   the highly permeable material further configured to allow vaporized high volatility components to permeate therethrough and into the outer space vacuum to remove the high volatility components from the liquid mixture.

34. A system for removing high volatility components comprising:
   a highly permeable material configured as a membrane for contact with a liquid mixture having high volatility components and low volatility components on one side and an outer space vacuum an outer space vacuum provided by an outer space environment on the other side; and
   the permeable material further configured to allow vaporized high volatility components to permeate therethrough and into the outer space vacuum to remove the high volatility components from the liquid mixture.

\* \* \* \* \*